United States Patent [19]

Kolkman

[11] 4,099,692
[45] Jul. 11, 1978

[54] TRANSFER APPARATUS FOR ENERGY SOURCES

[75] Inventor: Dick J. Kolkman, Gibsonia, Pa.

[73] Assignee: Westinghouse Air Brake Company, Swissvale, Pa.

[21] Appl. No.: 787,659

[22] Filed: Apr. 14, 1977

[51] Int. Cl.² .............................................. H02J 9/06
[52] U.S. Cl. .................................. 246/34 CT; 307/64
[58] Field of Search .............. 246/34 R, 34 CT, 63 R, 246/63 C, 128, 129, 130; 307/64; 340/333; 315/86; 104/149, 150, 153

[56] References Cited

U.S. PATENT DOCUMENTS

| 1,681,158 | 8/1928 | Anderson | 307/64 |
|---|---|---|---|
| 1,756,589 | 4/1930 | Gilson | 307/64 |
| 3,201,592 | 8/1965 | Reinert | 307/64 |

Primary Examiner—Trygve M. Blix
Assistant Examiner—Reinhard J. Eisenzopf
Attorney, Agent, or Firm—A. G. Williamson, Jr.; R. W. McIntire, Jr.

[57] ABSTRACT

First and second monitoring channel apparatus detect the level of the normal output and load current, respectively, supplied by a principal energy source to a variable load network. Source output varies from normal to low level and load current from low to high level as load network varies between relatively no load and heavy load conditions. The monitor channel detection signals are checked through a logic circuit so that if at least one exceeds a predetermined level indicating the operable condition of the principal source, a registry device is actuated to hold the energy supply leads to the load network connected to the principal source. If neither monitor detects an operable condition of the source, the registry device is operated to activate, and transfer the load energy supply leads to, a standby source.

10 Claims, 2 Drawing Figures

TRANSFER APPARATUS FOR ENERGY SOURCES

BACKGROUND OF THE INVENTION

My invention pertains to transfer apparatus for energy sources. More specifically, the invention relates to apparatus which automatically transfers to a standby energy source if the main or principal source fails to supply energy to the associated load circuitry.

In some types of electrical installations, it is extremely important to have continuity of service even though failures in parts of the apparatus may occur. For example, the reliability of railroad track circuits is a critical factor, particularly in interlocking areas where a track circuit failure will lock out the involved interlocking routes. If the track circuit is of the audio frequency (AF) type so that a transmitter unit having a selected frequency is the source of energy for track circuit operation, failure of this transmitter will cause the track circuit to fail, that is, to indicate an occupied condition, and thus lock out the signaling system involved. It is, of course, possible to provide a standby transmitter for such critical track circuits. However, the peculiar characteristics of a track circuit between its unoccupied and occupied conditions, that is, between a very light load and an extremely heavy load requirement, make automatic changeover control more difficult than with simpler fixed load arrangements. The transfer apparatus must distinguish between the required output for the transmitter between the two load conditions to assure that changeover to the standby occurs only if the principal transmitter has actually failed and is providing no output at all. A similar situation will exist where a special type of energy source is providing operating energy to a load circuit or network in which an extreme variation occurs between the light or no load and the full load conditions. Accordingly, an object of my invention is a circuit arrangement for automatically transferring from a main to a standby energy source for supplying a variable load network.

Another object of the invention is transfer apparatus for shifting from a main to a standby energy source for a track circuit.

A further object of my invention is appartus for audio frequency track circuits to transfer from the principal transmitter energy source to a standby transmitter source if the principal source is detected as having failed under either unloaded or loaded conditions within the track circuit.

Still another object of the invention is apparatus for shifting automatically to a standby energy source if the output of a main or principal source is detected as having failed under either loaded or unloaded conditions in the circuit network.

Also an object of my invention is an energy source transfer circuit arrangement having first and second detection or monitoring channels for checking the output from the energy source whether it is supplying a loaded or unloaded circuit network and for shifting to an alternate energy source if no output is detected under either load condition.

A still further object of the invention is transfer apparatus for shifting from a main transmitter to an alternate or standby transmitter to supply energy to an audio frequency track circuit, the transfer apparatus including two output detection channels, one responsive to a no-load output condition when the track circuit is unoccupied and the other responsive to a loaded output condition when the track is occupied, the presence of at least one of the two detection signals being required to hold the main transmitter in service.

Other objects, features, and advantages of my invention will become apparent from the following specification and appended claims when taken with the accompanying drawings.

SUMMARY OF THE INVENTION

In practicing my invention, I provide a main or principal source of energy, which is normally active to supply the load circuit network, and an inactive standby source which is shifted into use to supply the load if the main source becomes inoperative. The operational condition of the main source is detected by two monitoring or detector channels. One channel functions when the load is light so that the source voltage level is normal. The second channel functions as the load current increases due to a normal change in the load characteristics. The continued detection of the main source output under either load condition is logically checked to retain a registry of this operational condition of the main source. The simultaneous absence of the detection signal from both channels releases an operational indication registry means. This release activates the standby source and actuates a transfer of the energy input connections of the load to the second source.

The specific illustration of the invention is the supply of energy to an audio frequency (AF) track circuit. Main and standby AF transmitters are provided, each generating energy at the selected track circuit frequency. The main source is continuously active, that is, energized, while the second is normally deenergized. The load placed by a track circuit on its source of energy varies between the unoccupied and occupied condition of the corresponding track section and is especially heavy as a train approaches the location or end of the section where the transmitter source is connected to the rails. A first monitoring channel includes a transformer with a primary circuit connected across the source and tuned to the track circuit frequency. The output of the transformer secondary is rectified and applied to an amplifier and level detector stage. When this transformer output exceeds a predetermined level, indicative of a properly operating transmitter, the amplifier/level detector produces sufficient output to trigger another switching or level detection circuit through one input of a two-input OR gate. The output of this second level detection circuit is further processed (amplified) to energize a registry means which is shown specifically as a relay. In its energized or picked up position, the relay connects the main source to the track rails to energize the track circuit. If the main source or transmitter output falls below a selected level, the registry relay releases. This energizes the standby transmitter and also transfers the rail connections to the output terminals of the standby transmitter to supply the track circuit from the source.

The second monitoring channel includes the primary winding of a second coupling transformer connected in series with the leads from the main transmitter to the rails. Thus this transformer monitors the changes in the load on the energy source, i.e., the rail current. The output of the secondary of this second transformer is rectified and applied to another amplifier, level detector circuit network has a preselected output level indicative of proper operation of the main source transmitter. When the input from the transformer secondary exceeds this preselected level, the amplifier stage output, which is fed into the second input of the OR gate, actuates the second level detection circuit which results in energy being supplied to the registry relay. The operating levels of the two channels are adjusted for some overlap so that detection of a properly operating main transmitter will be continuous. The reasons for having two detection or monitoring channels which separately monitor the normal and the load outputs is to counteract the change in the characteristics of the track circuit load between the unoccupied and occupied conditions of the track section, as will be explained in more detail later.

BRIEF DESCRIPTION OF THE DRAWINGS

Prior to defining the invention in the claims, I shall describe a specific embodiment of the invention as applied to a track circuit and also one set of specific circuits and apparatus which will provide the desired operation, referring during this description to the accompanying drawings in which:

In each of the drawings, similar apparatus is designated by the same or similar references. For convenience and simplicity, the local source of operating energy for the apparatus (not the track circuit) is illustrated by the reference B and N which, respectively, designate connections to the positive and negative terminals of the direct current source.

DESCRIPTION OF THE ILLUSTRATED EMBODIMENTS

Figure 1:
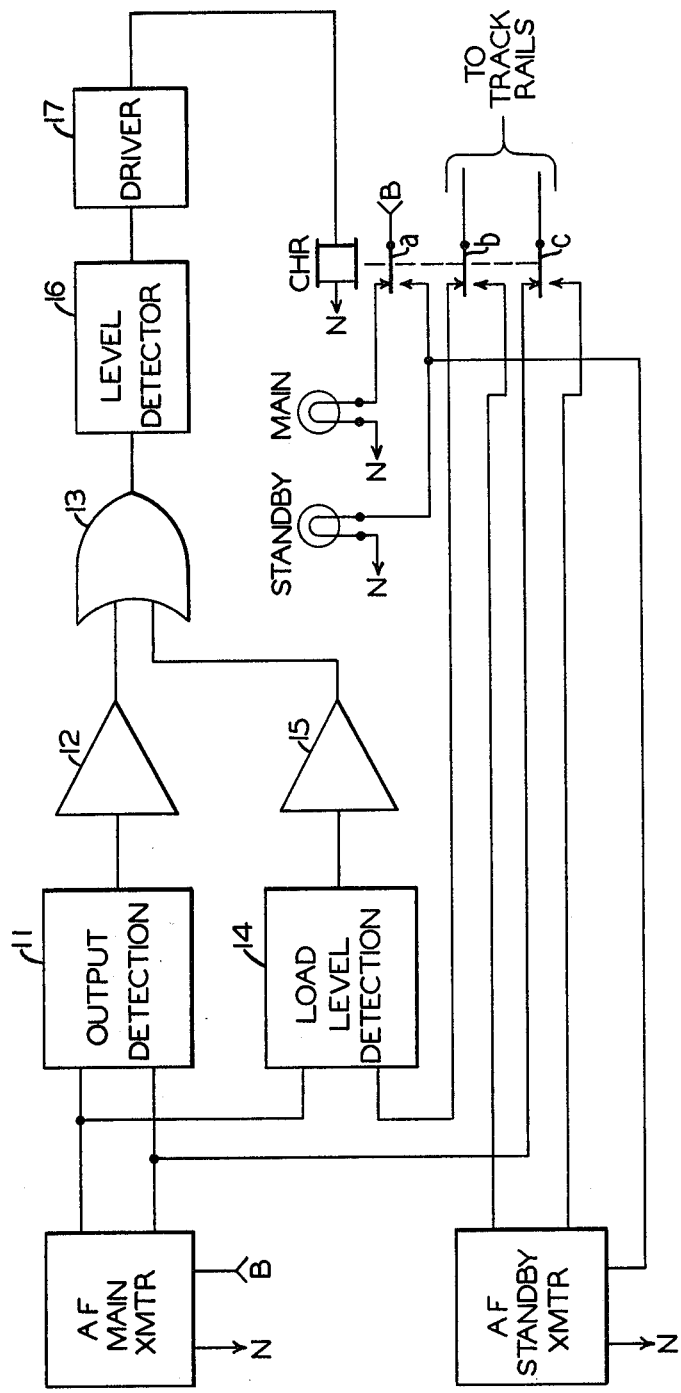
FIG. 1 is a block circuit diagram illustrating the basic, source transfer arrangement embodying the invention.
Figure 2:
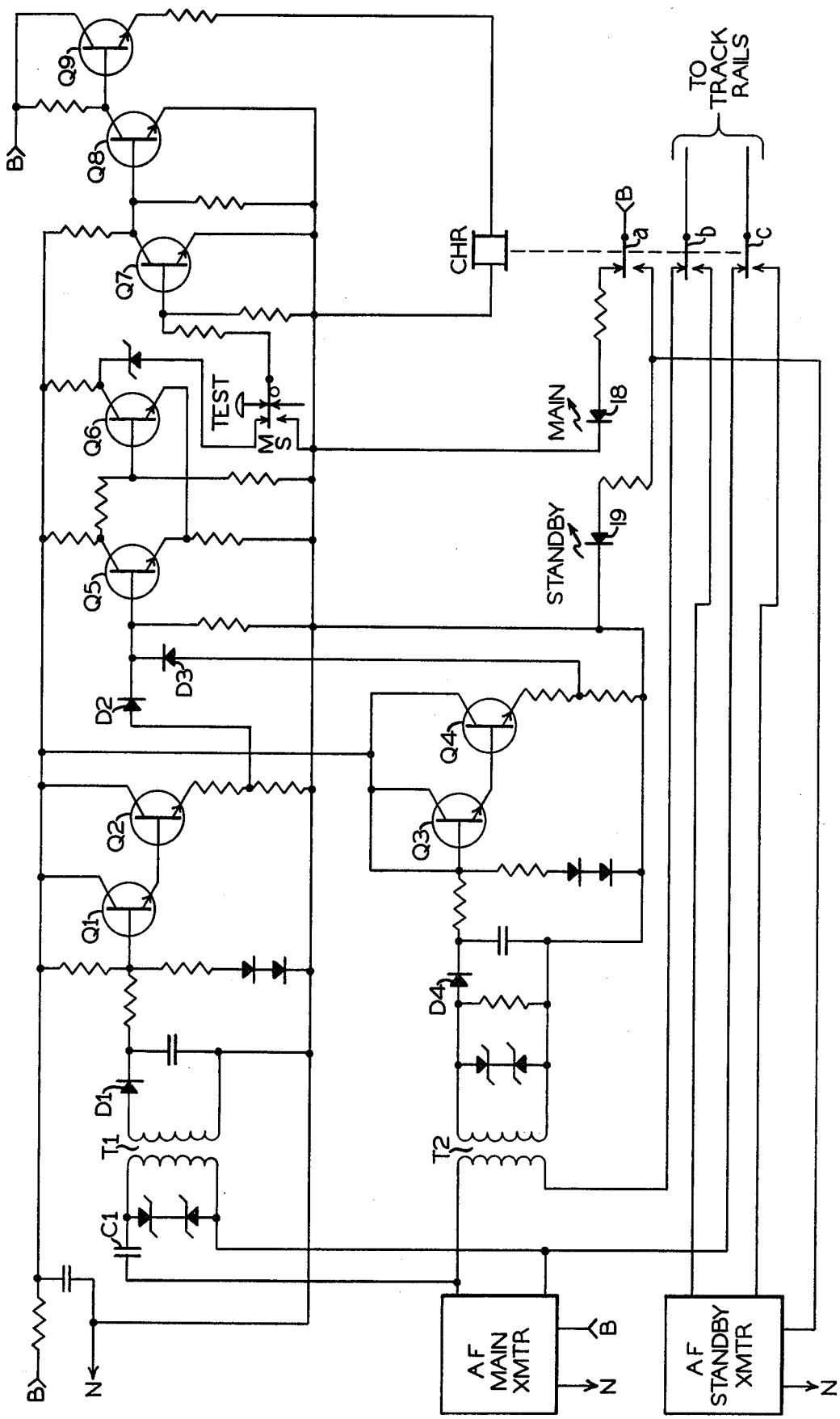
FIG. 2 is a circuit diagram illustrating one specific type of cicruit apparatus for applying the source transfer arrangement of FIG. 1 to a track circuit.

Referring to FIG. 1, a block diagram circuit arrangement illustrates the basic concept of the disclosed transfer arrangement as applied to the energy source for a railroad track circuit of the audio frequency type. Conventional logic symbols are used for the amplifier stages and the OR logic circuit while labels define the conventional blocks used for the other elements of the circuit arrangement. At the left, the two blocks designate the audio frequency (AF) transmitters, the main and the standby sources as indicated. These and similar blocks in FIG. 2 represent well known transmitters used for AF track circuits to supply energy at the selected frequency for that particular track circuit. A specific example, if desired, may be found in U.S. Pat. No. 3,035,167 issued May 15, 1962, to P. H. Luft for a Railway Track Circuit with specific reference to FIG. 2 of that patent. The main transmitter is normally active, being continuously energized by the direct connections to terminals B and N of the local D. C. source. This transmitter thus maintains an energy output for supplying the track circuit unless some internal fault within the transmitter interrupts its operation. The standby transmitter unit is normally inactive, its connection to terminal B of the supply voltage being interrupted at back contact $a$ of the transfer or changeover relay CHR shown at the right of the drawing figure. Relay CHR is normally energized, as will be explained, so that its contact armatures are picked up and thus back contacts open. It may be noted that contacts $b$ and $c$ of relay CHR control the connections from the rails to the AF trannsmitters with front contacts $b$ and $c$ normally closed to connect the rails to the main transmitter. When relay CHR releases, the standby transmitter is energized by the connection from terminal B over back contact $a$ and the rails are connected over back contacts $b$ and $c$ to the standby output. It may be further noted that connections from the rails over front contacts $b$ and $c$ to the main transmitter include a portion of the one monitor circuit as will be more fully explained. Relay CHR through its contact $a$ also controls visual indications shown in this figure as indicator lights which designate which transmitter is supplying operating energy to the track circuit, as designated by the legends shown over the light symbols.

The output detection apparatus designated by conventional block 11 is connected across the output of the main transmitter in parallel with the leads to the track rails. This apparatus is of any known arrangement which will detect the voltage level of the main transmitter output and is tuned to eliminate various signals due to energy improperly induced into the rail circuit. The output from unit 11 is applied to an amplifier stage 12 which will provide an operational output signal when the energy level supplied by the main transmitter is above a preselected level which indicates proper operation of the apparatus. The amplifier 12 output is applied to one input of a two-input OR gate 13.

The load level detection unit or apparatus 14 is connected in series with the leads from the main transmitter to the rails over front contacts $b$ and $c$ of relay CHR. Unit 14 may be any known circuitry which will respond to the level of the current flowing in the rail connections, that is, the track current. It is obvious that this varies as the associated track section is unoccupied or occupied by a train and also with the location of the train within the track section. In other words, the track current is at its lowest level when the track section is unoccupied, increases as a train enters the distant end of the track section, and continues to increase to its highest level as the train approaches the location of the connection of the leads from the transmitter to the rails. Again, the detection signal is rectified and amplified in a stage 15, with a predetermined level detection such that an operational output from the amplifier stage occurs only if the track current level is sufficient to indicate proper operation of the transmitter unit.

The output from amplifier 15 is applied to the second input of OR gate 13. In turn, the output of the gate is applied to an appropriate level detection circuit network 16 which, when either or both inputs to gate 13 exist at or above the proper level, is actuated to indicate an operational condition. The output of unit 16 is applied to a driver circuit network 17 which amplifies the signal to a sufficient level to energize relay CHR which registers an indication that the main transmitter is properly operational. Under normal operating conditions, this output from driver unit 17 is continuous to hold relay CHR energized. Obviously, if neither input to gate 13 is active, relay CHR receives no energy and releases. This occurs if neither the voltage level nor the load level from the main transmitter is sufficient to actuate either monitoring channel. An indication is then registered, that is, relay CHR releases and the STANDBY indicator is lighted, that the main transmitter has suffered a failure and that the standby is being placed in service. Release of relay CHR to close its back contacts accomplishes this action and thus avoids a failure of the track circuit due to an energy source fault, which increases the reliablity of the track circuit operation.

The reason for monitoring the output level of the main transmitter as well as the change in its load is to counteract the changing output conditions of a properly working AF transmitter unit, while supplying the track circuit load, in order to avoid unnecesary changeover to the standby transmitter. Assuming that no train is present in the associated track section, the load current for the track circuit will be substantially lower than the preselected level at which amplifier stage 15 will supply a signal through OR gate 13 to actuate level detector 16 and thus energize relay CHR. However, under these conditions, the output level of the transmitter into unit 11 will be substantially higher and exceed the preselected level at which amplifier stage 12 provides a sufficient signal to the OR gate. As a train moves into the track section, the load current will increase and eventually become large enough to actuate a sufficient output from amplifier stage 15. This offsets the loss of signal in the output detection channel due to the AF transmitter becoming loaded and reducing its output voltage. The transfer arrangement of the invention must be properly calibrated so that the load current monitoring channel provides an operational signal to the OR gate at some predetermined margin of time prior to the output level monitoring channel reducing its signal to the OR gate. This insures that a properly working AF transmitter unit keeps the register relay CHR energized with a train at any location in the track section. However, if the transmitter unit fails internally, both signals disappear, the level detector unit turns off, and the relay becomes deenergized and releases, thus connecting the standby transmitter unit to the track circuit through back contacts of that relay. The supply of normal and standby energy to any variable load network with similar characteristics can be controlled in the same manner. In other words, by monitoring both the output level of the energy source and the change in the load level to detect the proper operation of the main supply source, the transfer to the standby unit can be properly controlled so that it only occurs if an internal fault shuts off the main source.

A specific circuit network and apparatus which will provide the above described operation is shown in FIG. 2. It is to be understood that this is one example only of specific circuitry and that other arrangements using different circuit elements are possible. The main and standby transmitter units are shown by conventional blocks at the lower left of FIG. 2 and are the same as those units illustrated in FIG. 1. The main transmitter is continuously energized while the standby unit is energized only as needed when back contact $a$ of relay CHR, shown at the right, is closed. The output of the main transmitter is applied to a tuned LC circuit comprising a capacitor C1 and the primary winding of transformer T1 connected in series. This circuit is tuned to distinguish between the assigned operating frequency of the transmitters and any foreign current of any other frequency present in the track circuit. The output of the secondary winding of transformer T1 is rectified by diode D1 and applied to the input of a Darlington amplifier network which includes transistors Q1 and Q2 and provides an impedance match between transformer T1 and the remainder of the monitoring network. The values of the series resistors in the emitter circuit of transistor Q2 are selected such that when the input to the Darlington network exceeds a predetermined minimum operating level, that is, the level below which failure of the main transmitter is indicated, the output of the Darlington amplifier stage at the junction point between the resistors is sufficient to activate a Schmitt trigger circuit comprised of transistors Q5 and Q6. The output of the Darlington amplifier is acutally applied to one input of an OR gate consisting of diodes D2 and D3, specifically to diode D2, and thence to the base electrode of transistor Q5. Actuation of the Schmitt trigger circuit produces an output signal which is applied over the M contact of the test switch to the relay driver amplifier network including transistors Q7, Q8, and Q9. The final driver amplifier netork produces an output signal of sufficient level to energize relay CHR which is held picked up to retain a connection from the main transmitter to the rails.

The test switch is illustrated as a push-pull button which sticks when pushed, a conventional symbol being used. Contact M (MAIN) is normally closed and opens when the button is pushed. Contact S (STANDBY) is normally open and is closed when the pushbutton is pushed. Contact S sticks closed, once actuated, until the pushbutton is pulled. The test pushbutton switch is used to test the operability of the standby transmitter periodically. The operation of the test switch deactivates the driver circuits by connecting the base of transistor Q7 to terminal N of the source so that relay CHR releases. When relay CHR is picked up, it energizes a light-emitting diode 18 over its front contact $a$ to indicate that the main transmitter is in service and operational. When relay CHR releases and closes its back contack $a$, and equivalent light-emitting diode (LED) 19 is energized to indicate that the standby transmitter is in service. It is obvious that either LED 18 or 19 is always energized but not both simultaneously. Back contact $a$ of relay CHR also activates the standby transmitter by completing the circuit from terminal B to this latter unit.

The second monitor channel includes transformer T2, the primary winding of which is connected in series with the leads from the main transmitter to the rails of the track section over front contacts $b$ and $c$ of relay CHR. The current in this primary winding is thus responsive to the condition of the track circuit load, that is, unoccupied or occupied by a train. For example, as previously explained, the current is at a minimum level with an unoccupied track section and increases as the train occupies the section with the maximum current occurring when the train shunt is at the location of the transmitter rail connections. The output of the secondary winding of transformer T2 also varies in accordance with the load current level in the primary winding. The output of the secondary is rectified by diode D4 and applied to the input of a second Darlington amplifier network, comprised of transistors Q3 and Q4, whose output is applied to the second input D3 of the OR gate. When the output of the transformer T2 is at or above a preselected level representing an operational condition of the main transmitter under load, the Darlington stage output through the OR gate activates the Schmitt trigger (transistors Q5 and Q6) and, through the driver network, relay CHR is energized. The resistor networks which supply the inputs to the OR gate are calibrated so that an overlap exists between the output and the load monitoring channel indications which hold relay CHR energized. However, if both channel signals disappear, the Schmitt trigger is no longer activated and there is no signal through the driver stage so that relay CHR releases to register a failure of the main transmitter. The standby transmitter is then activated by the closing of back contact $a$ of relay CHR and its output is connected to the rails as back contacts *b* and *c* of relay CHR close. This completes the transfer from the main to the standby transmitter, as the result of a fault within the main transmitter, so that the track circuit operation may be continued. When the fault within the main transmitter is corrected, since this unit is no longer loaded, the first monitoring channel will receive sufficient output from the transmitter to activate the Schmitt trigger and thus, through the driver circuit, reenergize relay CHR which will pick up to tranfer back to the main transmitter service.

The arrangement of my invention thus provides for the transfer or changeover operation between principal and standby energy sources supplying a variable load ranging from a no-load condition to a very heavy current drain on the source. The two monitor channels are effective in detecting continued operability of the main source under all conditions from light load to heavy load. Calibration is possible to assure an overlap between the detection range of the two channels to inhibit improper shift to the standby source. At the same time, a fault condition which halts all output of the main source is quickly detected and the transfer made without delay. As shown, the arrangement is particularly applicable to critical AF track circuits where continued and reliable operation is desired. The resulting transfer apparatus is an efficient, economical, and reliable arrangement for transferring between energy sources supplying a variable load network.

Although I have herein shown and described but one general and one specific apparatus arrangement for providing an energy source transfer, it is to be understood that various changes and modifications therein may be made within the scope of the appended claims without departing from the spirit and scope of my invention.

Having now described the invention, what I claim as new and desire to secure by Letters Patent, is:

1. Transfer apparatus for shifting between a main and a standby energy source for supplying a variable load network, comprising in combination,
    (a) a first monitoring means coupled to said main source for detecting the unloaded output and responsive thereto for producing a first operational signal when that unloaded output exceeds a predetermined operating level,
    (b) a second monitoring means coupled between said main source and said load network for detecting the output of said main source when said network is heavily loaded and responsive to the detection of at least a preselected operating level of said main source for producing a second operational signal,
    (c) circuit means coupled to said first and said second monitoring means and responsive to an operational signal from either for producing a source operating indication signal, and
    (d) a registry means coupled for registering an operating indication signal received from said circuit means and controlling the source connections to said load network for connecting said main source to said load network when an operating indication signal is registered and transferring said connections to said standby source in the absence of a registered signal.

2. Transfer apparatus as defined in claim 1 in which said circuit means comprises,
    (a) an OR circuit network coupled for receiving said first and second operational signals and responsive to either signal for supplying a signal, and
    (b) a signal processing means coupled for receiving said OR circuit network signal and responsive thereto for generating an operating indication signal of sufficient level to actuate said registry means.

3. Transfer apparatus as defined in claim 2 in which,
    (a) said registry means is a relay which when energized connects said main source to said load and when deenergized activates and connects said standby source to said load,
and in which said signal processing means includes,
    (b) a level detection circuit means coupled for receiving said OR circuit network signal and responsive to pass said signal when it exceeds the predetermined level of said operational signals, and
    (c) a driver circuit network coupled for processing the signal passed by said level detection means to energize said relay to register said operating indication signal.

4. Transfer apparatus as defined in claim 3 in which,
    (a) said first monitoring means includes,
        (1) a first coupling means connected for receiving the output voltage of said main source and producing an output signal representing the level of that voltage, and
        (2) an amplifier means coupled between said first coupling means and said OR circuit network for supplying a first operational signal to said OR network when the output of said first coupling means is greater than said predetermined operating level, and
    (b) said second monitoring means includes,
        (1) a second coupling means connected for detecting the load current supplied by said main source and responsive for producing an output signal proportional to the level of that load current, and
        (2) another amplifier means coupled between said second coupling means and said OR circuit network for supplying a second operational signal to said OR circuit network when the output of said second coupling means is greater than the predetermined operating level.

5. Tranfer apparatus as defined in claim 4 in which,
    (a) said main and standby sources supply alternating current energy,
    (b) said first coupling means is a transformer having its primary winding connected across the output of said main source and its secondary winding connected for supplying a resulting signal to the associated amplifier means,
    (c) said second coupling means is another transformer having its primary winding connected in series with said load across said main source output, and its secondary winding connected for supplying an output to the associated amplifier means,
    (d) said predetermined operating level of the first amplifier means is indicative of the proper operating output of said main source under no load conditions,
    (e) said predetermined operating level of the other amplifier means is indicative of the proper operating output of said main source under loaded conditions, and
    (f) said level detection circuit means is a Schmitt trigger circuit which supplies an output signal having a predetermined level when an input signal of operational level is received from said OR circuit network.

6. Transfer apparatus for track circuit energy sources, the track circuit having at times an unoccupied condition and at other times an occupied condition, comprising in combination,
   (a) a first and a second source of track circuit energy, said first source normally in an active condition for supplying energy to said track circuit, said second source normally inactive,
   (b) a first detection channel coupled to said first source for detecting its unloaded output under an unoccupied track circuit condition and responsive for producing an operational signal only when said first source supplies an unloaded output exceeding a predetermined level indicative of proper operation,
   (c) a second detection channel coupled for detecting the supply of energy from said first source into an occupied track circuit and responsive only to the detection of such energy supply of at least a predetermined level indicative of proper operation of said first source for producing an operational signal,
   (d) circuit means coupled for receiving operational signals from said first and second detection channels and responsive to an operational signal from either detection channel for supplying an output signal, and
   (e) a registry means coupled for receiving said circuit means output signal and operable for connecting said first source to said track circuit while said circuit means output signal is received,
   (f) said registry means further operable for activating said second source and transferring the track circuit connections from said first source to said second source in response to the absence of a circuit means output signal.

7. Transfer apparatus as defined in claim 6 in which said circuit means comprises,
   (a) and OR gate circuit with two inputs coupled for receiving signals separately from said first and second detection channels, and
   (b) a signal processing means coupled for receiving a signal from said OR gate and responsive when either a first or a second channel oprational signal is present at an OR gate input for generating a signal to maintain said registry means operated to hold said first source connected to said track circuit.

8. Tranfer apparatus as defined in claim 7 in which,
   (a) said registry means is a relay operable for connecting said track circuit to said first source when energized and for activating and connecting said second source to said track circuit when deenergized, and in which said signal processing means includes,
   (b) a driver circuit network operable for supplying energy to said relay when an input signal is received, and
   (c) a Schmitt trigger circuit coupled for receiving a signal from said OR gate and operable for supying an input signal to said driver circuit network when an operational signal input from said OR gate is received.

9. Transfer apparatus as defined in claim 8 in which,
   (a) each source supplies alternating current energy of the same selected frequency,
   (b) said first detection channel includes,
      (1) a first transformer having its primary winding connected across said first source output, and
      (2) ammplifier means connected for receiving a rectified output from a first transformer secondary winding and operable for generating an operational signal only when the input exceeds said predetermined proper unloaded operating level,
      (3) said amplifier means being coupled for supplying its output signal to one input of said OR gate, and
   (c) said second detection channel includes,
      (1) a second transformer having a primary winding connected in series with said track circuit across said first source output, and
      (2) another amplifier means connected for receiving a rectified output from a second transformer secondary winding and operable for generating an operational signal only when the input exceeds a predetermined proper loaded operating level,
      (3) said other amplifier means being coupled for supplying its output signal to the second input of said OR gate.

10. Transfer apparatus as defined in claim 9, for an audio frequency track circuit, in which:
    (a) each source is an audio frequency transmitter generating a signal of said selected frequency when activated, and
    (b) the connection of said first transformer across said first transmitter source is tuned to said selected frequency.

* * * * *